United States Patent
Minamibayashi et al.

(10) Patent No.: US 11,973,252 B2
(45) Date of Patent: Apr. 30, 2024

(54) MULTILAYER ELECTROLYTE MEMBRANE, MEMBRANE ELECTRODE ASSEMBLY, WATER ELECTROLYSIS-TYPE HYDROGEN GENERATOR AND METHOD OF PRODUCING MULTILAYER ELECTROLYTE MEMBRANE

(71) Applicant: Toray Industries, Inc., Tokyo (JP)

(72) Inventors: Kenta Minamibayashi, Otsu (JP); Daisuke Ogata, Otsu (JP); Shusuke Shirai, Otsu (JP); Daisuke Izuhara, Otsu (JP)

(73) Assignee: Toray Industries, Inc., Tokyo (JP)

( * ) Notice: Subject to any disclaimer, the term of this patent is extended or adjusted under 35 U.S.C. 154(b) by 206 days.

(21) Appl. No.: 17/441,057

(22) PCT Filed: Mar. 19, 2020

(86) PCT No.: PCT/JP2020/012332
§ 371 (c)(1),
(2) Date: Sep. 20, 2021

(87) PCT Pub. No.: WO2020/196278
PCT Pub. Date: Oct. 1, 2020

(65) Prior Publication Data
US 2022/0216494 A1 Jul. 7, 2022

(30) Foreign Application Priority Data
Mar. 28, 2019 (JP) ................... 2019-063208

(51) Int. Cl.
*H01M 8/1069* (2016.01)
*B01D 69/12* (2006.01)
(Continued)

(52) U.S. Cl.
CPC ...... *H01M 8/1069* (2013.01); *B01D 69/1216* (2022.08); *H01M 8/1004* (2013.01);
(Continued)

(58) Field of Classification Search
CPC ............. H01M 8/1069; H01M 8/1004; H01M 8/1039; H01M 2008/1095;
(Continued)

(56) References Cited

U.S. PATENT DOCUMENTS

2007/0254599 A1  11/2007  O'Keefe et al.

FOREIGN PATENT DOCUMENTS

| JP | 2008-512884 A | 4/2008 |
| JP | 2013-062240 A | 4/2013 |

(Continued)

*Primary Examiner* — Daniel S Gatewood
(74) *Attorney, Agent, or Firm* — DLA Piper LLP (US)

(57) ABSTRACT

A laminated electrolyte membrane including a first layer including a hydrocarbon polymer electrolyte as a major component, and a second layer including a fluoropolymer electrolyte and polyvinylidene fluoride as major components laminated on at least one side of the first layer, wherein the first layer and the second layer are laminated via a region in which components constituting both layers are mixed in a mixed region.

14 Claims, 1 Drawing Sheet

(51) Int. Cl.
    *H01M 8/10* (2016.01)
    *H01M 8/1004* (2016.01)
    *H01M 8/1039* (2016.01)

(52) U.S. Cl.
    CPC .. *H01M 8/1039* (2013.01); *H01M 2008/1095* (2013.01); *H01M 2300/0082* (2013.01)

(58) Field of Classification Search
    CPC ....... H01M 2300/0082; H01M 4/8657; H01M 4/881; H01M 8/1025; H01M 8/1032; H01M 8/1044; H01M 8/1053; H01M 8/1081; H01M 8/1051; H01M 8/106; B01D 69/12; B01D 71/32; B01D 53/326; B01D 2256/16; C25B 1/02; C25B 1/04; C25B 9/23; C25B 13/02; C25B 13/08; C25B 9/73; C25B 11/061; H01B 1/125
    See application file for complete search history.

(56) References Cited

FOREIGN PATENT DOCUMENTS

| | | | |
|---|---|---|---|
| JP | 2013-077554 A | | 4/2013 |
| JP | 2013077554 A | * | 4/2013 |
| JP | 2016-216826 A | | 12/2016 |
| JP | 2020-023748 A | | 2/2020 |
| KR | 10-2018-0029382 A | | 3/2018 |
| WO | WO-2018048134 A1 | * | 3/2018 .......... H01M 8/1004 |

* cited by examiner

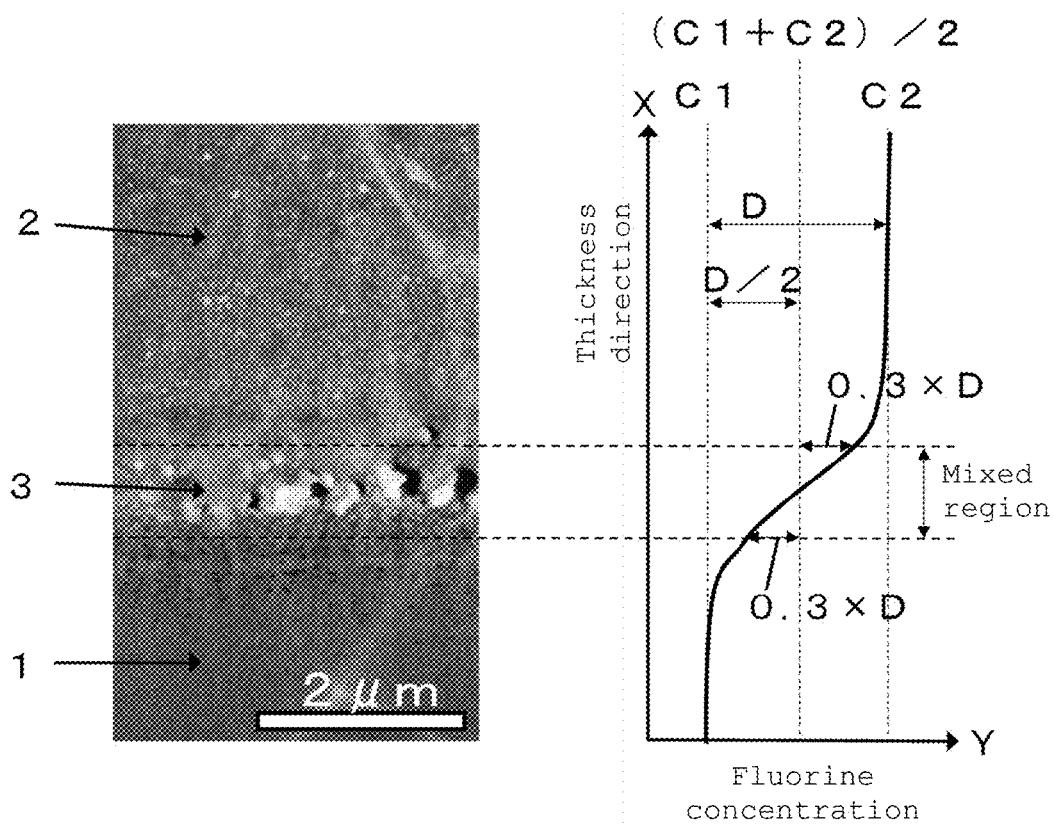

MULTILAYER ELECTROLYTE MEMBRANE, MEMBRANE ELECTRODE ASSEMBLY, WATER ELECTROLYSIS-TYPE HYDROGEN GENERATOR AND METHOD OF PRODUCING MULTILAYER ELECTROLYTE MEMBRANE

TECHNICAL FIELD

This disclosure relates to an electrolyte membrane to be used in a water electrolysis apparatus and a fuel cell.

BACKGROUND

Fuel cells are a kind of power generator from which electric energy is extracted by electrochemical oxidation of a fuel such as hydrogen, and have recently attracted attention as a clean energy source. Among such fuel cells, polymer electrolyte membrane (PEM) fuel cells have a low standard operating temperature of around 100° C. and a high energy density. Therefore, polymer electrolyte membrane fuel cells are expected to be widely applied to relatively small, distributed power generation facilities as well as to power generators for mobile objects such as automobiles and ships. Polymer electrolyte membrane fuel cells have also attracted attention as a power source for small mobile devices and portable devices, and are expected to be installed in mobile phones, personal computers-or the like in place of secondary batteries such as nickel-hydrogen batteries and lithium-ion batteries.

Hydrogen, which is used as a fuel for fuel cells, is produced by various production methods. Electrolysis of water using surplus electric power from renewable energy can convert electric power into hydrogen energy without emission of carbon dioxide. Hydrogen production schemes by electrolysis of water include alkaline water electrolysis and polymer electrolyte membrane (PEM) water electrolysis. The PEM water electrolysis is advantageous in that it can be performed at high current density and can flexibly respond to output fluctuations of renewable energy.

The principle of the PEM type water electrolysis is shown below.
1. Water supplied to the anode is oxidized by voltage application to generate oxygen, protons, and electrons.
2. The protons are conducted to the cathode through ion-exchange groups in the electrolyte membrane.
3. The electrons are conducted from the anode to the cathode through an external circuit by voltage application.
4. Protons and electrons are bonded at the cathode to generate hydrogen.

As a polymer electrolyte membrane for use in such a PEM water electrolysis apparatus, an example of a membrane using a fluoropolymer electrolyte membrane represented by "Nafion (registered trademark)" manufactured by E. I. du Pont de Nemours and Company has been reported. However, the fluoropolymer electrolyte membrane is inherently high in hydrogen permeation and insufficient in hydrogen barrier properties. Therefore, water electrolysis apparatuses have problems in terms of safety such as decrease in current efficiency and mixing of oxygen and hydrogen due to permeation of generated hydrogen from the cathode to the anode. In addition, since the fluoropolymer electrolyte membrane is made of a material having low breaking strength such as rubber, there is a problem that the membrane is easily deformed. In addition, when the thickness of the electrolyte membrane is increased to solve the problem, there is also a problem that the electrolysis efficiency of the water electrolysis apparatus decreases as the proton conductivity decreases.

To solve such a problem, it has been proposed to use a hydrocarbon polymer electrolyte membrane instead of a fluoropolymer electrolyte membrane (for example, Japanese Patent Laid-Open Publication No. 2016-216826). The hydrocarbon polymer electrolyte membrane has superior hydrogen barrier properties even when it is a thin membrane, and can suppress deformation from high breaking strength.

One of the problems concerning the application of a hydrocarbon polymer electrolyte membrane is adhesiveness between an electrolyte membrane and a catalyst layer. Japanese Patent Laid-Open Publication No. 2008-512884 proposes a catalyst-coated electrolyte membrane in which adhesiveness between an electrolyte membrane and a catalyst layer is improved by disposing an adhesiveness promotion layer composed of a fluoropolymer electrolyte and graphitized carbon particles between the electrolyte membrane and the catalyst layer.

However, we found that a catalyst-coated electrolyte membrane in which a hydrocarbon polymer electrolyte membrane is used has the following two problems:
1) Adhesiveness between the electrolyte membrane and the adhesiveness promotion layer is insufficient, and a voltage increase due to delamination occurs.
2) When there is electrical contact between the catalyst layer and the hydrocarbon polymer electrolyte membrane and the electrode has a high potential as in a water electrolysis apparatus, the hydrocarbon polymer electrolyte membrane undergoes oxidative degradation.

SUMMARY

An electrolyte membrane in which a second layer comprising a fluoropolymer electrolyte and polyvinylidene fluoride as major components is laminated on at least one side of a first layer comprising a hydrocarbon polymer electrolyte as a major component, wherein the first layer and the second layer are laminated via a region in which components constituting both layers are mixed (such a region is hereinafter referred to as a "mixed region").

The electrolyte membrane can thus achieve good adhesiveness between the first layer and the second layer, and between the catalyst layer and the second layer. In addition, the hydrocarbon polymer electrolyte layer as the first layer can be prevented from coming into contact with the electrode on the higher potential side, and oxidative degradation can be prevented.

BRIEF DESCRIPTIONS OF THE DRAWINGS

FIG. 1 is an enlarged cross-sectional photograph of an example of a mixed region portion of a laminated electrolyte membrane.

DESCRIPTION OF REFERENCE SIGNS

1: First layer
2: Second layer
3: Mixed region

DETAILED DESCRIPTION

Hereinafter, our laminated electrolyte membranes will be described in detail.

Hydrocarbon Polymer Electrolyte

The "hydrocarbon polymer electrolyte" is an ionic group-containing hydrocarbon polymer. The "ionic group-containing hydrocarbon polymer" refers to a polymer having a main chain comprising a hydrocarbon as a main constituent unit and having an ionic group added to the main chain or a side chain, wherein the main chain or the side chain is substantially not fluorinated. The phrase "substantially not fluorinated" does not exclude a polymer having a fluorinated portion in a very small part of the main chain or side chain. Specifically, a polymer having a content of fluorine atoms of less than 5% based on the number average molecular weight of the polymer is also referred to as an ionic group-containing hydrocarbon polymer.

The hydrocarbon polymer that constitutes the hydrocarbon polymer electrolyte is particularly preferably an aromatic hydrocarbon polymer. The aromatic hydrocarbon polymer is a polymer including a hydrocarbon skeleton and having an aromatic ring in the main chain. Specific examples of the aromatic hydrocarbon polymer include polymers having, in the main chain, a structure selected from among polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine oxide, polyether phosphine oxide, polybenzoxazole, polybenzothiazole, polybenzimidazole, polyamide, polyimide, polyetherimide, and polyimidesulfone together with the aromatic ring. "Polysulfone", "polyether sulfone", "polyether ketone" and the like referred to herein are generic terms for structures having a sulfone bond, an ether bond, or a ketone bond in their molecular chains, and encompass polyether ketone ketone, polyether ether ketone, polyether ether ketone ketone, polyether ketone ether ketone ketone, and polyether ketone sulfone and the like. The hydrocarbon skeleton may have a plurality of structures among the above-mentioned structures. Above all, it is most preferable that the aromatic hydrocarbon polymer comprises a polyether ketone polymer, which is a polymer having a polyether ketone structure in the main chain, as a main component. The phrase "comprise as a main component" means that the mass of the ether ketone structural moiety as a repeat unit is 50 mass % or more where the mass of the entire polymer is 100 mass %.

The ionic group contained in the hydrocarbon polymer electrolyte may be any ionic group having a proton exchange ability. As such an ionic group, a sulfonic acid group, a sulfonimide group, a sulfuric acid group, a phosphonic acid group, a phosphoric acid group, and a carboxylic acid group are preferably used. The polymer may contain two or more types of ionic groups. Among them, the polymer more preferably has at least a sulfonic acid group, a sulfonimide group, or a sulfuric acid group from the viewpoint of high proton conductivity, and most preferably has a sulfonic acid group from the viewpoint of raw material cost.

Fluoropolymer Electrolyte

The "fluoropolymer electrolyte" is a polymer having a main chain containing perfluorocarbon as a main constituent unit and having an ionic group added to the main chain or a side chain. Examples of such a fluoropolymer electrolyte include a perfluorocarbon polymer having a sulfonate group, which polymer may contain an etheric oxygen atom. Above all, a copolymer having a repeat unit based on tetrafluoroethylene and a repeat unit of perfluorocarbon having a sulfonate group is preferable. Examples of commercially available products of such a copolymer include perfluorocarbon sulfonic acid polymers such as Nafion (registered trademark, manufactured by E. I. du Pont de Nemours and Company) and Aquivion (registered trademark, manufactured by Solvay SA), polytrifluorostyrene sulfonic acid polymers, perfluorocarbon phosphonic acid polymers, trifluorostyrene sulfonic acid polymers, ethylene tetrafluoroethylene-g-styrene sulfonic acid polymers, ethylene-tetrafluoroethylene copolymers, polyvinylidene fluoride-perfluorocarbon sulfonic acid polymers, ethylene-tetrafluoroethylene copolymers, and resins having trifluorostyrene as a base polymer. From the viewpoint of power generation performance such as heat resistance and chemical stability, a fluoropolymer electrolyte constituted of a perfluorocarbon sulfonic acid polymer is particularly preferable.

Platinum

The laminated electrolyte membrane may preferably comprise platinum. Platinum may be used by applying platinum itself or reducing a platinum precursor compound. Examples of the platinum precursor include $H_2Pt(OH)_6$ and $PtO_2 \cdot nH_2O$. When a platinum precursor is used, reduction to platinum can be easily performed by using a reducing agent in a solution containing the platinum precursor. As the reducing agent for the platinum precursor, hydrogen, hydrazine, formaldehyde, formic acid or oxalic acid, methanol, ethanol, 1-propanol, isopropanol, 1-butanol, 2-butanol, mixtures thereof can be used.

The particle diameter of the platinum to be used for the laminated electrolyte membrane is not particularly limited, but it is preferable to use platinum having a small particle diameter to thin a hydrogen permeation preventing layer. The particle diameter of platinum is preferably 1 μm or less, more preferably 100 nm or less, and even more preferably 20 nm or less.

Platinum may be contained in any one of the first layer, the second layer, and the third layer described later, but is preferably contained in the second layer or the third layer.

Polyvinylidene Fluoride

As for the "polyvinylidene fluoride", not only a homopolymer of vinylidene fluoride (namely, pure polyvinylidene fluoride) but also a copolymer of vinylidene fluoride and another copolymerizable monomer is encompassed by the polyvinylidene fluoride. As the monomer copolymerizable with vinylidene fluoride, for example, one or more than one of tetrafluoroethylene, hexafluoropropylene, trifluoroethylene, trichloroethylene, and vinyl fluoride may be used. Such polyvinylidene fluoride can be obtained by emulsion polymerization or suspension polymerization.

In addition, as for the polyvinylidene fluoride to be used in the second layer, when the molecular weight thereof is large, entanglement of molecular chains of the polyvinylidene fluoride, the hydrocarbon polymer electrolyte, and the fluoropolymer electrolyte in the mixed region is strong so that adhesiveness is improved. Therefore, the weight average molecular weight of polyvinylidene fluoride is preferably 300,000 or more, and more preferably 500,000 or more.

First Layer

The laminated electrolyte has a layer comprising a hydrocarbon polymer electrolyte as a major component (first layer). The hydrocarbon polymer electrolyte forming this layer is as described above. "Comprise as a major component" means that 50 mass % or more of all components contained in a unit volume in a portion of the first layer excluding the mixed region described later is occupied by a hydrocarbon polymer electrolyte, and that portion of the first layer is constituted by the hydrocarbon polymer electrolyte preferably 70 mass % or more, more preferably 80 mass % or more, and particularly preferably substantially completely. "Substantially" means allowing to contain other components in a trace amount, and specifically less than 1% by mass, and typically means not containing other components.

Second Layer

The laminated electrolyte membrane has a layer comprising a fluoropolymer electrolyte and polyvinylidene fluoride as major components (second layer) on at least one side of the first layer. "Comprise as a major component" means that 50 mass % or more of all components contained in a unit volume in a portion of the second layer excluding the mixed region described later is occupied by a fluoropolymer electrolyte and polyvinylidene fluoride, and that portion of the second layer is constituted by the fluoropolymer electrolyte and the polyvinylidene fluoride preferably 70 mass % or more, more preferably 80 mass % or more, and particularly preferably substantially completely. "Substantially" means allowing to contain other components in a trace amount, and specifically less than 1% by mass, and typically means not containing other components.

In the second layer, when the content ratio of the fluoropolymer electrolyte is low, the membrane resistance increases. Therefore, the content of the fluoropolymer electrolyte is preferably 20 mass % or more, more preferably 60 mass % or more, and even more preferably 70 mass % or more where the total mass of the fluoropolymer electrolyte and the polyvinylidene fluoride is 100 mass %. When the content of the fluoropolymer electrolyte increases and the content ratio of the polyvinylidene fluoride decreases, adhesiveness to the first layer decreases. Therefore, the fluoropolymer electrolyte preferably accounts for 90 mass % or less, and more preferably 80 mass % or less where the total mass of the fluoropolymer electrolyte and the polyvinylidene fluoride is 100 mass %. Within such a range, both adhesiveness and ion conductivity are achieved, and both efficiency and durability are effectively achieved. The weight ratio of the fluoropolymer electrolyte to the polyvinylidene fluoride is determined in a portion of the second layer excluding the mixed region described later.

The first layer made of a hydrocarbon polymer electrolyte is used as a major electrolyte layer so that high hydrogen barrier properties and mechanical strength can be realized. Therefore, the thickness of the second layer is preferably 40% or less, more preferably 30% or less, and even more preferably 20% or less with respect to the thickness of the first layer. In addition, when the thickness of the second layer decreases, the thickness of the mixed region decreases and the adhesiveness between the first layer and the second layer decreases. Therefore, the thickness of the second layer is preferably 1% or more, and more preferably 5% or more with respect to the thickness of the first layer. The measurement and determination of the thicknesses of the first layer and the second layer are as described in the Examples below.

Third Layer

The laminated electrolyte membrane can have a layer comprising a fluoropolymer electrolyte as a major component laminated on a surface of the second layer opposite from the surface on which the first layer is laminated (third layer).

The third layer does not contain any hydrocarbon polymer electrolyte. "Comprise as a major component" means that 60 mass % or more of all components contained in a unit volume of the third layer is occupied by a fluoropolymer electrolyte, and that the third layer is constituted by the fluoropolymer electrolyte preferably 70 mass % or more, more preferably 80 mass % or more, and particularly preferably substantially completely. "Substantially" means allowing to contain other components (excluding the hydrocarbon polymer electrolyte) in a trace amount, and specifically less than 1% by mass, and typically means not containing other components.

When the first layer made of a hydrocarbon polymer electrolyte is used as a major electrolyte layer, higher hydrogen barrier properties and mechanical strength are realized. Therefore, the thickness of the third layer is preferably 40% or less, more preferably 30% or less, and even more preferably 20% or less with respect to the thickness of the first layer. The lower limit is preferably 0.1% or more with respect to the thickness of the first layer.

Method of Producing Laminated Electrolyte Membrane

The laminated electrolyte membrane can be produced by the following steps.

First, as a first step, a first layer comprising a hydrocarbon polymer electrolyte as a major component is formed.

In one example of a method of forming the first layer, the first layer can be formed by performing a step of forming a layer in a state where the ionic group contained in the hydrocarbon polymer electrolyte forms a salt with a cation of an alkali metal or an alkaline earth metal, and a step of exchanging the cation of the alkali metal or the alkaline earth metal forming the salt with the ionic group by a proton, in this order. Hereinafter, this forming method will be described in more detail. The polymer electrolyte in a state where the ionic group forms a salt with a cation of an alkali metal, or an alkaline earth metal is hereinafter referred to as a "salt-type polymer electrolyte".

The method of forming the first layer includes a step of exchanging the cation of the alkali metal or the alkaline earth metal forming the salt with the ionic group by a proton after forming the layer of the salt-type polymer electrolyte. The step of exchanging the cation with a proton is preferably a step of bringing the salt-type polymer electrolyte into contact with an acidic aqueous solution. The contact is more preferably a step of immersing the first layer in an acidic aqueous solution. In this step, the proton in the acidic aqueous solution is substituted with the cation that is ionically bonded to the ionic group, and residual water-soluble impurities, residual monomers, solvents, residual salts-and the like are simultaneously removed. The acidic aqueous solution to be used is not particularly limited, and it is preferable to use a protic acid such as sulfuric acid, hydrochloric acid, nitric acid, acetic acid, trifluoromethanesulfonic acid, methanesulfonic acid, phosphoric acid, or citric acid. The temperature and concentration of the acidic aqueous solution should be appropriately determined. From the viewpoint of productivity, it is preferable to use an aqueous sulfuric acid solution having a concentration of 3 mass % or more and 30 mass % or less at a temperature of 0° C. or more and 80° C. or less.

The solvent to be used for forming the first layer may be appropriately chosen according to the polymer species. Examples of the solvent to be suitably used include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphone triamide, ester solvents such as γ-butyrolactone, ethyl acetate, and butyl acetate, carbonate solvents such as ethylene carbonate and propylene carbonate, and alkylene glycol monoalkyl ethers such as ethylene glycol monomethyl ether, ethylene glycol monoethyl ether, propylene glycol monomethyl ether, and propylene glycol monoethyl ether. In addition, a mixed solvent prepared by mixing two or more types of these solvents may be used.

In addition, for the purpose of adjusting the viscosity, it is also possible to mix, with the solvent, various low boiling point solvents including alcohol solvents such as methanol, ethanol, 1-propanol, and isopropyl alcohol, ketone solvents such as acetone, methyl ethyl ketone, and methyl isobutyl ketone, ester solvents such as ethyl acetate, butyl acetate, and ethyl lactate, hydrocarbon solvents such as hexane and cyclohexane, aromatic hydrocarbon solvents such as benzene, toluene, and xylene, halogenated hydrocarbon solvents such as chloroform, dichloromethane, 1,2-dichloroethane, perchloroethylene, chlorobenzene, dichlorobenzene, and hexafluoro isopropyl alcohol, ether solvents such as diethyl ether, tetrahydrofuran, and 1,4-dioxane, nitrile solvents such as acetonitrile, nitrated hydrocarbon solvents such as nitromethane and nitroethane, and water.

One example of the method of forming the second layer is a method of forming an electrolyte layer comprising a fluoropolymer electrolyte and polyvinylidene fluoride as major components on the first layer formed. When the solvent for forming a membrane remains in the laminated electrolyte membrane even after drying, it is preferable to wash the laminated electrolyte membrane with pure water.

As the solvent to form the second layer, a solvent having high affinity with the first layer component is preferable from the viewpoint of forming a mixed region in the vicinity of the interface between the first layer and the second layer and improving adhesiveness. Therefore, it is preferable to use an aprotic polar solvent, and it is more preferable to use a solvent used during the formation of the first layer.

The peel strength between the first layer and the second layer of the laminated electrolyte membrane is preferably 0.3 N or more, more preferably 1.0 N or more, and particularly preferably 2.0 N or more. The upper limit is not particularly limited, but is generally 10.0 N or less. As the peel strength increases, delamination between the first layer and the second layer is suppressed, and deterioration in performance during operation of the apparatus can be prevented.

Mixed Region

In the laminated electrolyte membrane, the first layer and the second layer are laminated via a region in which the components constituting both layers are mixed (mixed region).

As shown in FIG. 1, the mixed region refers to a region that is sandwiched between a layer formed of only the component constituting the first layer and a layer formed of only the component constituting the second layer and has a length in a thickness direction (for convenience, this length is also referred to as "thickness") observed by the method described in the Examples below of 0.1 μm or more, and in this region, at least one species selected from among a hydrocarbon polymer electrolyte, polyvinylidene fluoride, and a fluoropolymer electrolyte is observed. The adhesive force between the first layer and the second layer is enhanced as the mixed region is thicker. Therefore, the thickness of the mixed region is preferably 0.2 μm or more, more preferably 0.5 μm or more, and even more preferably 1.0 μm or more. On the other hand, if the mixed region is excessively thick and the hydrocarbon polymer electrolyte is exposed on the surface layer of the laminated electrolyte membrane, the hydrocarbon polymer electrolyte in contact with an electrode may undergo oxidative degradation when used as an electrolyte membrane. Therefore, the thickness of the mixed region is preferably a thickness to such an extent that the hydrocarbon polymer electrolyte is not exposed to the surface layer, and is preferably a thickness of 80% or less of the total thickness of the first layer and the second layer.

The concentration of the polymer electrolyte solution to be used is preferably 3 to 40 mass %, and more preferably 5 to 30 mass %. If the solution viscosity is excessively low, the solution is not retained well and liquid flow occurs. On the other hand, when the solution viscosity is excessively high, the surface smoothness of the electrolyte membrane may deteriorate.

As a method of applying the polymer electrolyte solution to be used at the time of forming the first layer and the second layer by cast coating, techniques such as knife coating, direct roll coating, Meyer bar coating, gravure coating, reverse coating, air knife coating, spray coating, brush coating, dip coating, die coating, vacuum die coating, curtain coating, flow coating, spin coating, screen printing, and inkjet coating can be applied.

To dry the solvent, the drying method may be selected from among known methods such as heating of the substrate, hot air, and an infrared heater. The drying temperature is preferably 200° C. or lower, more preferably 130° C. or lower in consideration of decomposition of the polymer electrolyte.

For the purpose of improved mechanical strength, improved thermal stability of the ionic group, improved water resistance, improved solvent resistance, improved radical resistance, improved coating property of the coating liquid, and improved storage stability, a crosslinking agent and additives used in usual polymer compounds, such as a crystal nucleating agent, a plasticizer, a stabilizer, a mold release agent, an antioxidant, a radical scavenger, and inorganic fine particles may be added to the laminated electrolyte membrane as long as they are not contrary to the desired effect.

The laminated electrolyte membrane can be applied to various uses. For example, the laminated electrolyte membrane can be applied to medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the laminated electrolyte membrane can be more preferably used in various electrochemical uses. Examples of the electrochemical uses include solid polymer fuel cells, redox flow batteries, electrochemical hydrogen pumps, hydrogen purification apparatuses, water electrolysis apparatuses, and chloro-alkali electrolysis apparatuses, and the laminated electrolyte membrane is particularly preferably used for water electrolysis apparatuses.

Catalyst-Coated Electrolyte Membrane, Membrane Electrode Assembly, and Electrochemical Hydrogen Pump, Water Electrolysis Hydrogen Generator The cell to be used in the water electrolysis apparatus has a structure in which a catalyst layer, an electrode substrate, and a separator are sequentially stacked on either side of the laminated electrolyte membrane. Among them, a laminate in which catalyst layers are laminated on both sides of a laminated electrolyte membrane (that is, one having a layer configuration of catalyst layer/electrolyte membrane/catalyst layer) is referred to as a catalyst-coated electrolyte membrane (CCM), and a laminate in which a catalyst layer and a gas diffusion substrate are sequentially laminated on both sides of an electrolyte membrane (that is, one having a layer configuration of gas diffusion substrate/catalyst layer/electrolyte membrane/catalyst layer/gas diffusion substrate) is referred to as a membrane electrode assembly (MEA).

Examples of a common method of producing a CCM include a coating method of applying a catalyst layer paste composition for forming a catalyst layer to a surface of an electrolyte membrane and drying the composition, and a method of producing only a catalyst layer on a substrate, and transferring the catalyst layer to laminate the catalyst layer on the electrolyte membrane (a transfer method).

As for the catalyst layer, the catalyst layer located on the anode side is referred to as an anode catalyst layer, and the catalyst layer located on the cathode side is referred to as a cathode catalyst layer. It is desirable to dispose the second layer between the first layer and the anode catalyst layer. Such an arrangement prevents direct contact between the first layer and the anode catalyst layer, thereby suppressing oxidative degradation of the components constituting the first layer and preventing deterioration of performance when used in a device such as a fuel cell or a water electrolysis hydrogen generator.

When the MEA is produced by pressing, it is possible to employ a known method (for example, the chemical plating method described in The Journal of the Electrochemical Society of Japan, 1985, 53, p. 269, edited by J. Electrochem. Soc., and the hot-press bonding method for gas diffusion electrodes described in Electrochemical Science and Technology, 1988, 135, 9, p. 2209). The temperature and pressure at the time of pressing may be appropriately selected according to the thickness and water content of the electrolyte membrane, the catalyst layer, and the electrode substrate. In addition, it is possible to form a composite by pressing regardless of whether the electrolyte membrane is in a dry state or in a moistened state. Specific examples of the pressing method include roll pressing in which the pressure and clearance are prescribed, and plate pressing in which the pressure is prescribed, and from the viewpoint of industrial productivity or suppression of thermal decomposition of the polymer material having an ionic group, the pressing is preferably performed in a range of 0° C. to 250° C. From the viewpoint of protecting the electrolyte membrane and the electrodes, it is preferable that the pressure be as low as possible within the range in which the adhesion between the electrolyte membrane and the catalyst layer is maintained. In plate pressing, a pressure of 10 MPa or less is preferable. It is also one of the preferable options from the viewpoint of prevention of short circuit between the anode and cathode electrodes that the electrodes and the electrolyte membrane be stacked on each other without forming a composite by the pressing step to form a cell for the water electrolysis apparatus. In this method, during the repeated operation of the water electrolysis apparatus, the deterioration of the electrolyte membrane, which is presumed to be caused by short circuit, tends to be suppressed, and the water electrolysis apparatus is improved in durability. In addition, in controlling the pressing conditions, it is preferable from the viewpoint of obtaining a uniform catalyst-coated electrolyte membrane without wrinkles or delamination to raise the temperature after pressurization, hold the laminate at a prescribed pressure and a prescribed temperature, then lower the temperature while maintaining the pressure, and then release the pressure. If the temperature is raised while the pressure is applied or the pressure is released before the temperature is lowered, three-dimensional thermal shrinkage may occur in a state where the interface between the electrolyte membrane and the catalyst layer is not fixed, resulting in delamination due to wrinkles or poor adhesion.

Physical properties required for the feeder of the water electrolysis hydrogen generator include gas-liquid flow path function, good conductivity, acid resistance, oxidation resistance, hydrogen embrittlement resistance, heat resistance, and processability, and any material having such physical properties can be used. Examples of such a material include a porous conductive sheet comprising a conductive material as a major constituent, and examples of the conductive material include a calcined material from polyacrylonitrile, a calcined material from pitch, carbon materials such as graphite and expanded graphite, stainless steel, molybdenum, titanium, nickel, zirconium, niobium, and tantalum.

As the anode-side feeder, an inorganic conductive substance, which is not oxidized by a high potential at the anode during water electrolysis, is preferred, stainless steel, molybdenum, titanium, nickel, zirconium, niobium, tantalum, and the like are preferred, and titanium is particularly preferred. The form of the conductive substance is not particularly limited, for example, may be fibrous or particulate, and a fibrous conductive inorganic substance (inorganic conductive fiber) is preferable. As the porous conductive sheet using inorganic conductive fibers, either structure of a woven fabric and a nonwoven fabric can be used. As the woven fabric, a plain weave, a twill weave, a satin weave, a pattern weave, a binding weave, etc. are used without particular limitation. As the nonwoven fabric, a nonwoven fabric produced by a method such as a papermaking method, a needle punching method, a spunbonding method, a water jet punching method, or a melt blowing method is used without particular limitation. The porous conductive sheet using inorganic conductive fibers may be an expanded metal, a punching metal, or a knitted fabric.

To the porous conductive sheet, it is also preferable to add conductive particles such as carbon black or conductive fibers such as carbon fibers as an auxiliary agent for improving conductivity. In addition, it is also preferable that the surface of the porous conductive sheet is plated with platinum for improving stability.

EXAMPLES

Our membranes, assemblies and methods will be described in more detail with reference to examples, but this disclosure is not to be construed as being limited to the examples.

1. Evaluation Methods

The measurement conditions of the respective physical properties are as follows.
(1) Molecular Weight of Polymer
The number average molecular weight and the weight average molecular weight of a polymer solution were measured by gel permeation chromatography (GPC). Using HLC-8022GPC manufactured by Tosoh Corporation as an ultraviolet detector-differential refractometer integrated device, and using two TSKgel SuperHM-H columns (inner diameter: 6.0 mm, length: 15 cm) manufactured by Tosoh Corporation as GPC columns, the measurement was performed with an N-methyl-2-pyrrolidone solvent (N-methyl-2-pyrrolidone solvent containing 10 mmol/L of lithium bromide) at a flow rate of 0.2 mL/min, and the number average molecular weight and the weight average molecular weight were determined in terms of standard polystyrene.

(2) Ion Exchange Capacity (IEC)

The ion exchange capacity was measured by the neutralization titration method. The measurement was performed three times, and the average of the three measurements was adopted.
1. A measurement sample was subjected to proton exchange and thoroughly washed with pure water, and water on the surface was wiped off. Then, the sample was vacuum-dried at 100° C. for 12 hours or more, and the dry weight of the sample was determined.
2. To the electrolyte was added 50 mL of a 5 mass % aqueous sodium sulfate solution, and the electrolyte was left standing for 12 hours for ion exchange.
3. The generated sulfuric acid was titrated using a 0.01 mol/L aqueous sodium hydroxide solution. A commercially available 0.1 w/v % phenolphthalein solution for titration was added as an indicator, and the point at which the solution turned pale red-purple was taken as the end point.
4. The IEC was calculated by the following formula:

IEC (meq/g)=[concentration (mmol/ml) of aqueous sodium hydroxide solution×dropping amount (ml)]/dry weight (g) of sample.

(3) Thickness of Electrolyte Membrane

The film thickness was measured using model ID-C112 manufactured by Mitutoyo Corporation set on Granite Comparator Stand BSG-20 manufactured by Mitutoyo Corporation.

As for the thickness, an electrolyte membrane is cut into a 10-cm square piece, the thickness is measured at positions of 5 cm from the end in the MD and 1 cm, 3 cm, 5 cm, 7 cm, and 9 cm from the end in the TD, and positions of 5 cm from the end in the TD and 1 cm, 3 cm, 5 cm, 7 cm, and 9 cm from the end in the MD, and the average of the thicknesses at the nine positions is calculated. The average is defined as the thickness of the electrolyte membrane.

(4) Confirmation of Mixed Region by Scanning Transmission Electron Microscope (STEM), Measurement of Thickness Thereof, and Determination of Thicknesses of First Layer, Second Layer, and Third Layer A sample piece of an electrolyte membrane was immersed in a 2 mass % aqueous lead acetate solution as a staining agent, and the sample piece was left standing at 25° C. for 48 hours for staining treatment. The stained sample was taken out and embedded in an epoxy resin. A 100-nm thick slice was cut out using an ultramicrotome at room temperature, and the slice was observed according to the following conditions.

A. EDX quantitative analysis is performed on a cross section of an electrolyte membrane slice from one surface (referred to as "surface a" for convenience) side toward the other surface side, that is, in the thickness direction. The measurement device and measurement conditions are as follows:

Device: Atomic Resolution Analytical Electron Microscope (STEM)

JEM-ARM200F Dual-X (manufactured by JEOL Ltd.)

EDX detector JED2300 (manufactured by JEOL Ltd.)

Acceleration voltage: 200 kV.

B. Focusing on the fluorine atom concentration, in the measurement of the previous item A, the intensity distribution in the thickness direction of the fluorine atom concentration is determined with the distance from the surface a as the X axis and the fluorine atom concentration as the Y axis.

This is performed for 10 samples. From the resulting 10 intensity distribution curves is obtained an intensity distribution curve in which the fluorine atom concentration is averaged with the average value of the fluorine atom concentration as the Y axis (one example is shown in FIG. 1). It is needless to say that all the samples are measured from the same surface side. In FIG. 1, the Y axis indicates a larger value in the direction of the arrow.

C. In the intensity distribution curve obtained by averaging the fluorine atom concentrations obtained in the previous item B, the minimum value of the fluorine atom concentration in a portion corresponding to the first layer and the maximum value of the fluorine concentration in a portion corresponding to the second layer or the third layer are taken as the fluorine atom concentration of the layer. The corresponding portion can be understood from the lamination order and the SEM photographic image.

D. Where the fluorine atom concentration of the first layer obtained in the previous item C is denoted by C1 and the fluorine atom concentration of the second layer is denoted by C2, a position on the X axis that indicates a fluorine atom concentration of (C1+C2)/2, the position being located between a position on the X axis where C1 is determined and a position on the X axis where C2 is determined, is regarded as a boundary surface between the first layer and the second layer. When there is a plurality of positions that are located on the X axis and indicate a fluorine atom concentration of (C1+C2)/2, the position determined by the arithmetic average of the X-axis coordinate values corresponding to the fluorine atom concentrations is regarded as the boundary surface between the first layer and the second layer.

When a third layer is present, a surface regarded as a boundary surface between the first layer or the second layer and the third layer is similarly obtained.

E. Where the difference between C1 and C2, that is, |C1−C2| is denoted by D, a region between positions on the X axis that indicate fluorine concentrations of (C1+C2)/2+0.3×D and (C1+C2)/2−0.3×D, the positions being located between a position on the X axis where C1 is determined and a position on the X axis where C2 is determined, is defined as a mixed region, and a thickness corresponding to (C1+C2)/2±0.3×D is defined as the thickness of the mixed region. When there is a plurality of positions on the X-axis that indicates the fluorine concentration of (C1+C2)/2+0.3×D or (C1+C2)/2−0.3×D, the position determined by the arithmetic average of the X-axis coordinate values corresponding to the fluorine atom concentrations is defined as a position corresponding to (C1+C2)/2+0.3×D or (C1+C2)/2−0.3×D.

F. The thicknesses of the first layer, the second layer, and the third layer are determined based on the position of the surface regarded as the boundary surface of each layer determined above and the distance from the surface a.

(5) Adhesiveness Test

An electrolyte membrane is immersed in pure water at 80° C. for 24 hours, and the presence or absence of delamination between the first layer and the second layer is observed. When no delamination was observed was represented as "adhesion" in the table, and when delamination was observed was represented as "delamination".

(6) Peeling Test

1. An electrolyte membrane or a catalyst-coated electrolyte membrane to be evaluated and a commercially available product NR212 (Nafion 50 μm) each cut into 5 cm×12 cm are prepared.
2. In a catalyst-coated electrolyte membrane, the catalyst layer is wiped off with a solvent that does not dissolve the electrolyte membrane, such as alcohol.
3. A Teflon sheet is placed on the upper 3 cm portion of the long side on the electrolyte membrane to be evaluated (3 cm×5 cm), and the NR212 is superimposed thereon to be aligned with the electrolyte membrane to be evaluated.
4. The electrolyte membranes superimposed in the above 3. are stacked and hot-pressed at 150° C. and 4.5 MPa for 10 minutes.
5. The sample prepared in the above 4. is cut into a strip shape of 1 cm×12 cm, and thus a peeling test piece is prepared.
6. The electrolyte membrane to be evaluated and the NR 212 are held by the upper and lower chucks of the tensile tester, and the stress produced when the upper chuck is stroked is measured.
7. The average of the stress between stroke distances of 5 cm and 8 cm was calculated as the peeling force.
    Measurement device: Autograph AG-IS (manufactured by Shimadzu Corporation)
    Stroke speed: 10 mm/min
    Test piece: 1 cm in width×12 cm in length
    Distance between samples: 2 cm
    Test temperature: 23° C., in pure water
    Number of tests: n=5.

(7) Preparation of Catalyst-Coated Electrolyte Membrane (CCM)

A catalyst ink in which a platinum catalyst TEC10E50E manufactured by Tanaka Kikinzoku Kogyo K.K. and "Nafion (registered trademark)" manufactured by E. I. du Pont de Nemours and Company were adjusted to have a weight ratio of 2:1 was applied to a commercially available Teflon film such that the amount of platinum was 0.3 mg/cm$^2$, and thus a cathode catalyst layer transfer film A100 was prepared.

A catalyst ink in which an iridium oxide catalyst manufactured by Umicore S.A. and "Nafion (registered trademark)" manufactured by E. I. du Pont de Nemours and Company were adjusted to have a weight ratio of 2:1 was applied to a commercially available Teflon film such that the amount of iridium was 2.5 mg/cm$^2$, and thus an anode catalyst layer transfer film A200 was prepared. The anode catalyst layer transfer film A200 and the cathode catalyst layer transfer film A100 are each cut into a 5-cm square piece. A pair of the pieces is prepared, and the pieces are stacked to face each other to sandwich a polymer electrolyte membrane to be evaluated. When a laminated electrolyte membrane is used as the polymer electrolyte membrane, the cathode catalyst layer transfer film A100 is disposed on the surface on the first layer side, and the anode catalyst layer transfer film A200 is disposed on the surface on the second layer side or the third layer side. Then, the resulting laminate was heated in a pressurized state and hot-pressed at 150° C. and 5 MPa for 3 minutes, cooled to 40° C. or less in the pressurized state, and then the pressure was released, affording a catalyst-coated electrolyte membrane for a water electrolysis apparatus including the film A200 as the anode and the film A100 as the cathode.

(8) Preparation of Membrane Electrode Assembly (MEA)

The catalyst-coated electrolyte membrane for a water electrolysis apparatus was sandwiched between two commercially available porous sintered titanium plates, affording a membrane electrode assembly for a water electrolysis apparatus.

(9) Water Electrolysis Performance Test

The membrane electrode assembly for a water electrolysis apparatus was set in a JARI standard cell "Ex-1" (electrode area: 25 cm$^2$) manufactured by EIWA Corporation, the cell temperature was set to 80° C., and pure water having a conductivity of 1 μcm$^{-1}$ or less was supplied to one electrode (oxygen generating electrode: anode) at a flow rate of 0.2 L/min at atmospheric pressure. The other electrode (hydrogen evolution electrode: cathode) had a structure capable of controlling the pressure by a back pressure valve, and was purged with a 100% RH nitrogen gas such that the gas inside the electrode had the atmospheric pressure before the evaluation. An output was obtained at a load current of 50 A (current density: 2 A/cm$^2$) using a Multistat 1480 and a Power booster Model PBi500L-5U manufactured by Solartron. After the current was held at atmospheric pressure for 10 hours, the cell voltage at that time was measured. The lower the cell voltage, the better the water electrolysis efficiency.

(10) Water Electrolysis Durability Test

After the test (9), a load current of 50 A (current density: 2 A/cm2) was further held at atmospheric pressure for 200 hours, and then the cell voltage was measured. The amount of voltage increase after the durability test is shown in Table 1. The smaller the voltage increase from the test (9), the better the durability.

2. Synthesis Example

Synthesis Example 1

Synthesis of Block Copolymer b1

Synthesis of 2,2-bis(4-hydroxyphenyl)-1,3-dioxolane (K-DHBP) Represented by Formula (G1):

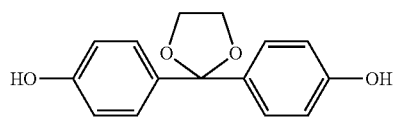
(G1)

A 500 mL flask equipped with a stirrer, a thermometer, and a distilling tube is charged with 49.5 g of 4,4'-dihydroxybenzophenone, 134 g of ethylene glycol, 96.9 g of trimethyl orthoformate, and 0.50 g of p-toluenesulfonic acid monohydrate which are then dissolved. Thereafter, the mixture was stirred for 2 hours while being kept at the temperature of 78 to 82° C. Furthermore, the internal temperature was gradually raised to 120° C., and heating was continued until the distillation of methyl formate, methanol, and trimethyl orthoformate completely stopped. The reaction solution was cooled to room temperature, then the reaction solution was diluted with ethyl acetate, and the organic layer was washed with 100 mL of a 5% aqueous potassium carbonate solution. After separating the solution, the solvent was distilled off. To the residue was added 80 mL of dichloromethane to precipitate crystals which were then filtered and dried, affording 52.0 g of 2,2-bis(4-hydroxyphenyl)-1,3-dioxolane.

Synthesis of disodium 3,3'-disulfonate-4,4'-difluorobenzophenone Represented by Formula (G2)

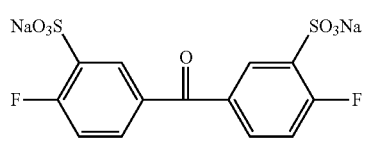
(G2)

4,4'-Difluorobenzophenone (109.1 g) (Aldrich reagent) was reacted in 150 mL of fuming sulfuric acid (50% SO3) (reagent of Wako Pure Chemical Industries, Ltd.) at 100° C. for 10 hours. Then, the mixture was charged little by little into a large amount of water, neutralized with NaOH, and then 200 g of common salt was added to precipitate the synthesized product. The precipitated product was filtered off and recrystallized from an aqueous ethanol solution, affording disodium 3,3'-disulfonate-4,4'-difluorobenzophenone represented by Formula (G2).

Synthesis of Ionic Group-Free Oligomer a1' Represented by the Following Formula (G3)

A 1000 mL three-necked flask equipped with a stirrer, a nitrogen inlet tube, and a Dean-Stark trap was charged with 16.59 g of potassium carbonate (Aldrich reagent, 120 mmol), 25.8 g (100 mmol) of K-DHBP, and 20.3 g of 4,4'-difluorobenzophenone (Aldrich reagent, 93 mmol), followed by nitrogen purge. Then, the resultant content was dewatered at 160° C. in 300 mL of N-methylpyrrolidone (NMP) and 100 mL of toluene. The dewatered content was heated to remove toluene and then subjected to polymerization at 180° C. for 1 hour. Purification was performed by reprecipitating with a large amount of methanol, affording an ionic group-free oligomer a1 (terminated by a hydroxyl group). The number average molecular weight was 10,000.

To a 500 mL three-necked flask equipped with a stirrer, a nitrogen inlet tube, and a Dean-Stark trap were added 1.1 g of potassium carbonate (Aldrich reagent, 8 mmol), and 20.0 g (2 mmol) of the ionic group-free oligomer a1 (terminated by a hydroxyl group), followed by nitrogen purge. Then, the resultant content was dewatered at 100° C. in 100 mL of NMP and 30 mL of cyclohexane. The resultant content was heated to remove the cyclohexane. Further 4.0 g of decafluorobiphenyl (Aldrich reagent, 12 mmol) was added and the resultant mixture was reacted at 105° C. for 1 hour. Purification was performed by reprecipitating with a large amount of isopropyl alcohol, affording an ionic group-free oligomer a1' (terminated by a fluoro group) represented by the following Formula (G3). The number average molecular weight was 11,000, and the number average molecular weight of the ionic group-free oligomer a1' was determined as 10,400 by subtracting the linker moiety (molecular weight: 630).

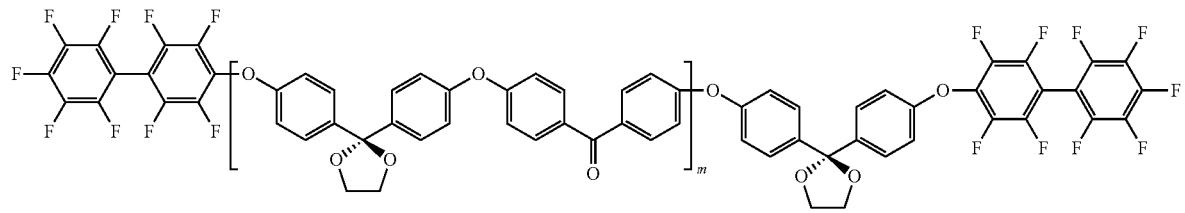
(G3)

wherein m is a positive integer.

Synthesis of Ionic Group-Containing Oligomer a2 Represented by the Following Formula (G4)

In a 1000-mL three-necked flask equipped with a stirrer, a nitrogen inlet tube, and a Dean-Stark trap, 27.6 g of potassium carbonate (Aldrich reagent, 200 mmol), 12.9 g (50 mmol) of K-DHBP, 9.3 g of 4,4'-biphenol (Aldrich reagent, 50 mmol), 39.3 g (93 mmol) of disodium-3,3'-disulfonate-4,4'-difluorobenzophenone, and 17.9 g of 18-crown-6 (Wako Pure Chemical Industries, Ltd., 82 mmol) were added. After nitrogen substitution, the contents were dehydrated in 300 mL of NMP and 100 mL of toluene at 170° C., then the temperature was raised to remove toluene, and the contents were polymerized at 180° C. for 1 hour. The resulting product was subjected to reprecipitation for purification in a large amount of isopropyl alcohol, affording an ionic group-containing oligomer a2 (terminated by a hydroxyl group) represented by the following Formula (G4). The number average molecular weight was 16,000.

C. The nickel-containing solution was poured into the solution, and a polymerization reaction was performed at 70° C. for 4 hours. The reaction mixture was added to 60 mL of methanol, then 60 mL of 6 mol/L hydrochloric acid was added to the mixture, and the mixture was stirred for 1 hour.

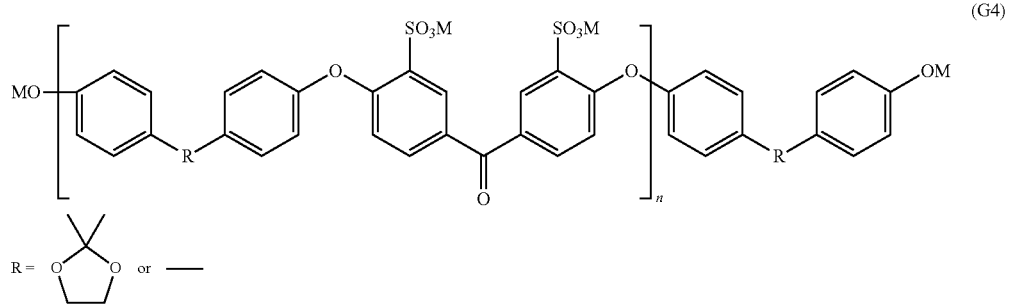

wherein, in Formula (G4), M represents sodium or potassium, and n is a positive integer. Synthesis of block polymer b1 comprising oligomer a2 as ionic group-containing segment (A1), oligomer a1 as ionic group-free segment (A2), and octafluorobiphenylene as linker moiety In a 500-mL three-necked flask equipped with a stirrer, a nitrogen inlet tube, and a Dean-Stark trap, 0.56 g of potassium carbonate (Aldrich reagent, 4 mmol) and 16 g (1 mmol) of the ionic group-containing oligomer a2 (terminated by a hydroxyl group) were added. After nitrogen substitution, the contents were dehydrated in 100 mL of NMP and 30 mL of cyclohexane at 100° C., the temperature was raised to remove cyclohexane, 11 g (1 mmol) of the ionic group-free oligomer a1' (terminal: fluoro group) was added, and the contents were reacted at 105° C. for 24 hours. The resulting product was subjected to reprecipitation for purification in a large amount of isopropyl alcohol, affording a block copolymer b1. The weight average molecular weight was 340,000.

The block copolymer b1 itself as a polymer electrolyte membrane was immersed in a 10 wt % aqueous sulfuric acid solution at 80° C. for 24 hours for proton exchange and a deprotection reaction, and was immersed in a large excess amount of pure water for 24 hours and thoroughly washed. The block copolymer b1 had an ion exchange capacity determined from the neutralization titration of 2.12 meq/g.

Synthesis Example 2

Synthesis of Clock Copolymer b2
Synthesis of Polyether Sulfone (PES) Block Copolymer Precursor b2' Including Segment Represented by the Following Formula (G6) and Segment Represented by the Following Formula (G7)

First, 1.78 g of anhydrous nickel chloride and 15 mL of dimethyl sulfoxide were mixed, and the mixture was adjusted to 70° C. To this was added 2.37 g of 2,2'-bipyridyl, and the mixture was stirred at the same temperature for 10 minutes to prepare a nickel-containing solution.

To a solution prepared by dissolving 1.64 g of (2,2-dimethylpropyl) 2,5-dichlorobenzenesulfonate and 0.55 g of polyether sulfone (SUMIKA EXCEL PES5200P manufactured by Sumitomo Chemical Company, Limited, Mn=40,000, Mw=94,000) represented by the following Formula (G5) in 5 mL of dimethyl sulfoxide was added 1.35 g of a zinc powder, and the resulting mixture was adjusted to 70°

The deposited solid was separated by filtration and dried to give 1.75 g of an off-white block copolymer precursor b2' (polyarylene precursor) including the segments represented by the following Formulae (G6) and (G7) in a yield of 97%. The weight average molecular weight was 210,000.

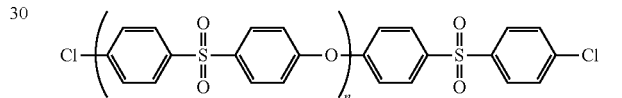

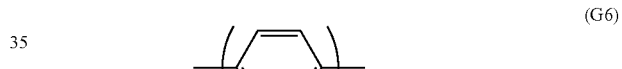

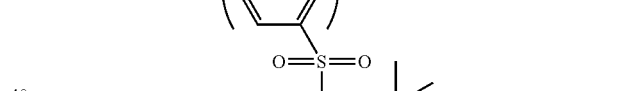

wherein n is independently a positive integer in Formulae (G5) and (G7).

Synthesis of Polyether Sulfone (PES) Block Copolymer b2 Including Segment Represented by the Formula (G7) and Segment Represented by the Following Formula (G8)

To a mixed solution of 0.18 g of lithium bromide monohydrate and 8 mL of N-methyl-2-pyrrolidone was added 0.25 g of the block copolymer precursor b2', and the mixture was reacted at 120° C. for 24 hours. The reaction mixture was poured into 80 mL of 6 mol/L hydrochloric acid and stirred for 1 hour. The deposited solid was separated by filtration. The separated solid was dried to give an off-white block copolymer b2 including the segment represented by Formula (G7) and a segment represented by the following Formula (G8). The resulting polyarylene had a weight average molecular weight of 190,000.

The block copolymer b2 itself as a polymer electrolyte membrane was immersed in a 10 wt % aqueous sulfuric acid solution at 80° C. for 24 hours for proton exchange, and was immersed in a large excess amount of pure water for 24 hours and thoroughly washed. The block copolymer b1 had an ion exchange capacity determined from the neutralization titration of 2.02 meq/g.

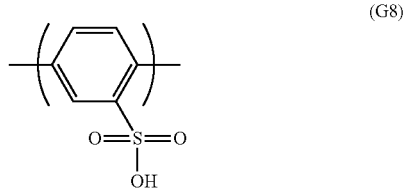
(G8)

Synthesis Example 3

Synthesis of Block Copolymer b3
Synthesis of Hydrophobic Oligomer a3 Represented by Formula (G9)

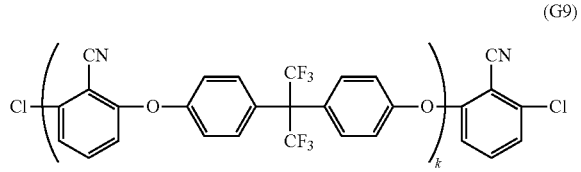
(G9)

wherein k is a positive integer.

In a 1-L three-necked flask equipped with a stirrer, a thermometer, a cooling tube, a Dean-Stark tube, and a three-way cock for introducing nitrogen were weighed 51.9 g (0.30 mol) of 2,6-dichlorobenzonitrile, 92.8 g (0.27 mol) of 2,2-bis(4-hydroxyphenyl)-1,1,1,3,3,3-hexafluoropropane, and 49.7 g (0.36 mol) of potassium carbonate.

After nitrogen substitution, 363 mL of sulfolane and 181 mL of toluene were added to the contents, and the resulting mixture was stirred. The flask was placed in an oil bath and heated to 150° C. for reflux. The water generated by the reaction was azeotropically distilled with toluene, and the reaction was continued with the water being removed to the out of the system with the Dean-Stark tube. As a result, generation of water almost ceased to be observed in about 3 hours. Most of toluene was removed with the reaction temperature being gradually raised, and then the reaction was continued at 200° C. for 3 hours. Then, 12.9 g (0.076 mol) of 2,6-dichlorobenzonitrile was added, and the reaction was performed for another 5 hours.

The obtained reaction liquid was allowed to cool, and then 100 mL of toluene was added for dilution. The by-produced inorganic compound precipitate was removed by filtration, and the filtrate was poured into 2 L of methanol. The precipitated product was separated by filtration, collected, and dried, and then dissolved in 250 mL of tetrahydrofuran. The resulting solution was reprecipitated in 2 L of methanol, affording 109 g of a target oligomer. The oligomer had a number average molecular weight of 8,000.

Synthesis of Hydrophilic Monomer Represented by Formula (G10):

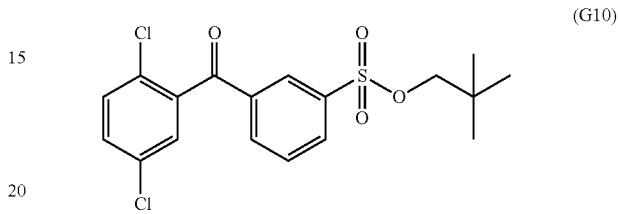
(G10)

To a 3-L three-necked flask equipped with a stirrer and a cooling tube was added 245 g (2.1 mol) of chlorosulfonic acid, and subsequently 105 g (420 mmol) of 2,5-dichlorobenzophenone was added, and the contents were reacted in an oil bath at 100° C. for 8 hours. After a prescribed time, the reaction liquid was slowly poured into 1,000 g of crushed ice and extracted with ethyl acetate. The organic layer was washed with brine and dried over magnesium sulfate, and then ethyl acetate was distilled away, affording light yellow crude crystals of 3-(2,5-dichlorobenzoyl)benzenesulfonic acid chloride. The crude crystals were used in the next step as they were without purification.

To 300 mL of pyridine was added 41.1 g (462 mmol) of 2,2-dimethyl-1-propanol (neopentyl alcohol), and the resulting mixture was cooled to about 10° C. The crude crystals obtained as described above were gradually added to the mixture over about 30 minutes. After all the crude crystals were added, the mixture was further stirred for 30 minutes to react. After the reaction, the reaction liquid was poured into 1,000 mL of aqueous hydrochloric acid, and the deposited solid was collected. The obtained solid was dissolved in ethyl acetate, the resulting solution was washed with an aqueous sodium hydrogen carbonate solution and brine and dried over magnesium sulfate, and ethyl acetate was distilled away, affording crude crystals. The crude crystals were recrystallized from methanol, affording white crystals of neopentyl 3-(2,5-dichlorobenzoyl)benzenesulfonate represented by the above structural formula.

Synthesis of Polyarylene Block Copolymer b3 Represented by Formula (G11):

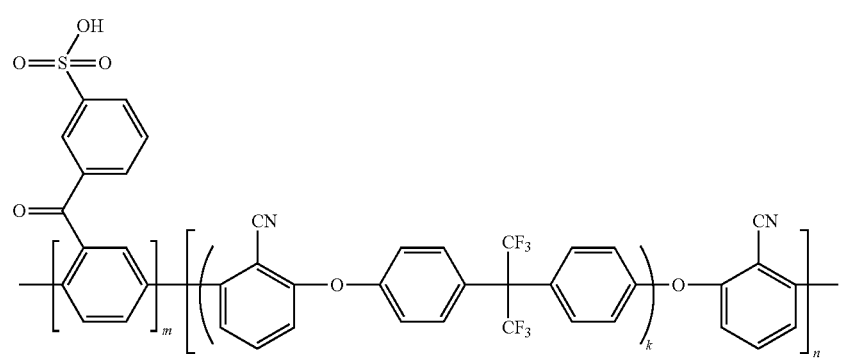
(G11)

wherein k, m, and n are each independently a positive integer.

In a 1-L three-necked flask equipped with a stirrer, a thermometer, and a nitrogen inlet tube, 166 mL of dried N,N-dimethylacetamide (DMAc) was added to a mixture of 15.1 g (1.89 mmol) of the hydrophobic oligomer a3, 39.5 g (98.4 mmol) of neopentyl 3-(2,5-dichlorobenzoyl)benzenesulfonate, 2.75 g (4.2 mmol) of bis(triphenylphosphine) nickel dichloride, 11.0 g (42.1 mmol) of triphenylphosphine, 0.47 g (3.15 mmol) of sodium iodide, and 16.5 g (253 mmol) of zinc under nitrogen.

The reaction system was heated (finally warmed to 82° C.) with stirring and reacted for 3 hours. An increase in the viscosity of the system was observed during the reaction. The polymerization reaction solution was diluted with 180 mL of DMAc, stirred for 30 minutes, and filtered using Celite as a filter aid. In a 1-L three neck flask equipped with a stirrer, 25.6 g (295 mmol) of lithium bromide divided into three equal portions was added to the filtrate in three additions at an interval of 1 hour, and the mixture was reacted at 120° C. for 5 hours in a nitrogen atmosphere. After the reaction, the mixture was cooled to room temperature, poured into 4 L of acetone, and solidified. The solidified product was collected by filtration, air-dried, pulverized with a mixer, and washed with 1,500 mL of 1 N sulfuric acid with stirring. After filtration, the product was washed with ion-exchanged water until the washing liquid came to have a pH of 5 or more, and then dried at 80° C. overnight, affording a target block copolymer b3. The block copolymer had a weight average molecular weight of 200,000.

The block copolymer b3 itself as a polymer electrolyte membrane was immersed in a 10 wt % aqueous sulfuric acid solution at 80° C. for 24 hours for proton exchange, and was immersed in a large excess amount of pure water for 24 hours and thoroughly washed. The block copolymer b1 had an ion exchange capacity determined from the neutralization titration of 2.38 meq/g.

Synthesis Example 4

Synthesis of Random Copolymer r1
Synthesis of Polyketal Ketone Random Copolymer r1 Containing Monomer Represented by Formula (G1), 4,4'-difluorobenzophenone, and monomer represented by Formula (G2)

In a 500-mL three-necked flask equipped with a stirrer, a nitrogen inlet tube, and a Dean-Stark trap were added 13.82 g of potassium carbonate (Aldrich reagent, 100 mmol), 20.66 g (80 mmol) of K-DHBP obtained as an intermediate product of Synthesis Example 1, 10.5 g of 4,4'-difluorobenzophenone (Aldrich reagent, 48 mmol), and 13.5 g (32 mmol) of disodium-3,3'-disulfonate-4,4'-difluorobenzophenone obtained as an intermediate product of Synthesis Example 1. After nitrogen substitution, the contents were dehydrated in 100 mL of N-methylpyrrolidone (NMP) and 50 mL of toluene at 180° C., the temperature was raised to remove toluene, and the contents were polymerized at 230° C. for 6 hours. The resulting product was subjected to reprecipitation for purification in a large amount of water, affording a polyketal ketone random copolymer. The random copolymer had a weight average molecular weight of 250,000.

The random copolymer r1 itself as a polymer electrolyte membrane was immersed in a 10 wt % aqueous sulfuric acid solution at 80° C. for 24 hours for proton exchange and a deprotection reaction, and was immersed in a large excess amount of pure water for 24 hours and thoroughly washed. The random copolymer r1 had an ion exchange capacity determined from the neutralization titration of 1.51 meq/g.

Example 1

In 80 g of NMP was dissolved 20 g of the block copolymer b1 obtained in Synthesis Example 1, and the resulting solution was stirred with a stirrer at 20,000 rpm for 1 hour to prepare a transparent polymer electrolyte solution b1 having a polymer concentration of 20 mass %.

The resulting polymer electrolyte solution b1 was pressure-filtered using a glass fiber filter, then the polymer electrolyte solution b1 was applied to a polyethylene terephthalate (PET) substrate by cast coating with an applicator, and dried at 100° C. for 4 hours, affording a film-shaped polymer. After being immersed in a 10 mass % aqueous sulfuric acid solution at 80° C. for 24 hours for proton exchange and a deprotection reaction, the polymer was immersed in a large excess amount of pure water for 24 hours to thoroughly wash, and dried at room temperature, affording a first layer (thickness: 50 μm).

To one side of the resulting first layer was formed a second layer by applying a polymer electrolyte solution A prepared by dissolving Nafion (commercially available D2020 solution manufactured by The Chemours Company with NMP replacement was used) as a fluoropolymer electrolyte and commercially available W #9300 (weight average molecular weight >1,000,000) manufactured by Kureha Corporation as polyvinylidene fluoride dissolved in NMP (solid content ratio: fluoropolymer electrolyte/polyvinylidene fluoride=60 mass %/40 mass %, solid concentration: 10 mass %) with a bar coater, drying the solution at 120° C. for 2 hours to form a layer, immersing the resultant in a large excess amount of pure water for 24 hours, and drying it at room temperature. Thus, a laminated electrolyte membrane (thickness: 55 μm) was obtained. The thickness of the mixed region of the resulting laminated electrolyte membrane was 1.8 μm.

Example 2

A laminated electrolyte membrane (thickness: 55 μm) was obtained in the same manner as in Example 1 except that 0.1 mass % of platinum fine particles (average particle diameter: 5 nm) were added to the polymer electrolyte solution A.

Example 3

On the second layer's surface on which the first layer of the laminated electrolyte membrane obtained in Example 1 was not formed, a third layer was formed by applying a 20 mass % solution of Nafion (commercially available D2020 solution manufactured by The Chemours Company) containing 0.2 mass % of platinum fine particles (average particle diameter: 5 nm) with a bar coater, and drying the solution at 100° C. for 1 hour. Thus, a laminated electrolyte membrane (thickness: 65 μm) was obtained.

Example 4

A laminated electrolyte membrane (thickness: 55 μm) was obtained in the same manner as in Example 1 except that commercially available W #7200 (weight average molecular weight=630,000) manufactured by Kureha Corporation was used as polyvinylidene fluoride instead of the commercially available W #9300 manufactured by Kureha Corporation.

Example

A laminated electrolyte membrane (thickness: 55 μm) was obtained in the same manner as in Example 1 except that commercially available W #1100 (weight average molecular weight=280,000) manufactured by Kureha Corporation was used as polyvinylidene fluoride instead of the commercially available W #9300 manufactured by Kureha Corporation.

Example 6

A laminated electrolyte membrane (thickness: 55 μm) was obtained in the same manner as in Example 1 except that the solid content ratio of the polymer electrolyte solution A was adjusted to fluoropolymer electrolyte/polyvinylidene fluoride=90 mass %/10 mass %.

Example 7

A laminated electrolyte membrane (thickness: 55 μm) was obtained in the same manner as in Example 1 except that the solid content ratio of the polymer electrolyte solution A was adjusted to fluoropolymer electrolyte/polyvinylidene fluoride=20 mass %/80 mass %.

Example 8

A laminated electrolyte membrane (thickness: 80 μm) was obtained in the same manner as in Example 1 except that the thickness of the second layer was adjusted to 30 μm.

Example 9

A laminated electrolyte membrane (thickness: 50.5 μm) was obtained in the same manner as in Example 1 except that the thickness of the second layer was adjusted to 0.5 μm.

Example 10

A laminated electrolyte membrane (thickness: 11 μm) was obtained in the same manner as in Example 1 except that the thickness of the first layer was adjusted to 10 μm and the thickness of the second layer was adjusted to 1 μm.

Example 11

A laminated electrolyte membrane (thickness: 11 μm) was obtained in the same manner as in Example 1 except that the thickness of the first layer was adjusted to 10 μm and the thickness of the second layer was adjusted to 1 μm.

Example 12

A laminated electrolyte membrane (thickness: 55 μm) was obtained in the same manner as in Example 1 except that the block copolymer b3 obtained in Synthesis Example 3 was used instead of the block copolymer b1.

Example 13

A laminated electrolyte membrane (thickness: 55 μm) was obtained in the same manner as in Example 1 except that the random copolymer r1 obtained in Synthesis Example 4 was used instead of the block copolymer b1.

Example 14

A laminated electrolyte membrane (thickness: 55 μm) was obtained in the same manner as in Example 1 except that the solid content ratio of the polymer electrolyte solution A was adjusted to fluoropolymer electrolyte/polyvinylidene fluoride=95 mass %/5 mass %.

Example 15

A laminated electrolyte membrane (thickness: 55 μm) was obtained in the same manner as in Example 1 except that the solid content ratio of the polymer electrolyte solution A was adjusted to fluoropolymer electrolyte/polyvinylidene fluoride=5 mass %/95 mass %.

Example 16

A laminated electrolyte membrane (thickness: 55 μm) was obtained in the same manner as in Example 1 except that commercially available W #7300 (weight average molecular weight >1,000,000) manufactured by Kureha Corporation was used as polyvinylidene fluoride instead of the commercially available W #9300 manufactured by Kureha Corporation.

Comparative Example 1

An electrolyte membrane (thickness: 50 μm) formed of the first layer alone was obtained in the same manner as described in the previous stage of Example 1. The initial performance was relatively good, but durability was poor so that it was disadvantageous as it was used for a long period of time.

Comparative Example 2

A laminated electrolyte membrane (55 μm) was obtained in the same manner as in Example 1 except for using a 20 mass % solution of Nafion in NMP (commercially available D2020 solution manufactured by The Chemours Company with NMP replacement was used) instead of the polymer electrolyte solution A. In the laminated electrolyte membrane after drying, delamination between the first layer and the second layer occurred.

Comparative Example 3

A laminated electrolyte membrane (55 μm) was obtained in the same manner as in Example 1 except for using, instead of the polymer electrolyte solution A, a polymer electrolyte solution B prepared by mixing a commercially available D2020 solution manufactured by The Chemours Company, which is a Nafion solution, a commercially available KYNAR LATEX RC-10,278 manufactured by Arkema, which is a polyvinylidene fluoride solution, and a solvent composed of water and isopropyl alcohol (IPA) in a mass ratio of 1:1 such that a mass ratio was 2.3:1:4.3.

The laminated electrolyte membrane prepared in this example did not form a mixed region.

Comparative Example 4

A commercially available D 2020 solution manufactured by The Chemours Company, which is a solution of Nafion, was applied by cast coating to a PET substrate, and dried at 100° C. for 1 hour, affording a first layer (thickness: 50 μm).

A polymer electrolyte solution B in which the block copolymer b1 and commercially available W #9300 manufactured by Kureha Corporation as polyvinylidene fluoride were dissolved in NMP (solid content ratio: block copolymer b1/polyvinylidene fluoride=60 mass %/40 mass %, solid concentration: 10 mass %) was applied to one side of the obtained first layer with a bar coater, and dried at 120° C. for 2 hours to form a layer. After being immersed in a 10 mass % aqueous sulfuric acid solution at 80° C. for 24 hours for proton exchange and a deprotection reaction, the polymer was immersed in a large excess amount of pure water for 24 hours to thoroughly wash, and dried at room temperature to prepare a second layer, affording a laminated electrolyte membrane (thickness: 55 μm). In the laminated electrolyte membrane after drying, delamination between the first layer and the second layer occurred.

Comparative Example 5

A Nafion film (thickness: 50 μm) was obtained in the same manner as described in the previous stage of Comparative Example 4. The constitutions and physical properties of the polymer electrolyte membranes used in the Examples and Comparative Examples, and the results of the hydrogen compression evaluation and the water electrolysis evaluation are shown in Table 1.

TABLE 1

| | First layer | | Second layer | | | | | | |
|---|---|---|---|---|---|---|---|---|---|
| | | | | | Fluoropolymer electrolyte | | Polyvinylidene fluoride | | |
| | Thickness (μm) | Polymer electrolyte | Thickness (μm) | Solvent | Kind | mass % | mass % | Molecular weight (×10$^5$) | Platinum |
| Example 1 | 50 | b1 | 5 | NMP | Nafion | 60 | 40 | >10 | — |
| Example 2 | 50 | b1 | 5 | NMP | Nafion | 60 | 40 | >10 | ○ |
| Example 3 | 50 | b1 | 5 | NMP | Nafion | 60 | 40 | >10 | — |
| Example 4 | 50 | b1 | 5 | NMP | Nafion | 60 | 40 | 6 | — |
| Example 5 | 50 | b1 | 5 | NMP | Nafion | 60 | 40 | 3 | — |
| Example 6 | 50 | b1 | 5 | NMP | Nafion | 90 | 10 | >10 | — |
| Example 7 | 50 | b1 | 5 | NMP | Nafion | 20 | 80 | >10 | — |
| Example 8 | 50 | b1 | 30 | NMP | Nafion | 60 | 40 | >10 | — |
| Example 9 | 50 | b1 | 0.5 | NMP | Nafion | 60 | 40 | >10 | — |
| Example 10 | 10 | b1 | 1 | NMP | Nafion | 60 | 40 | >10 | — |
| Example 11 | 50 | b2 | 5 | NMP | Nafion | 60 | 40 | >10 | — |
| Example 12 | 50 | b3 | 5 | NMP | Nafion | 60 | 40 | >10 | — |
| Example 13 | 50 | r1 | 5 | NMP | Nafion | 60 | 40 | >10 | — |
| Example 14 | 50 | b1 | 5 | NMP | Nafion | 95 | 5 | >10 | — |
| Example 15 | 50 | b1 | 5 | NMP | Nafion | 5 | 95 | >10 | — |
| Example 16 | 50 | b1 | 5 | NMP | Nafion | 60 | 40 | >10 | — |
| Comparative Example 1 | 50 | b1 | — | — | — | — | — | — | — |
| Comparative Example 2 | 50 | b1 | 5 | NMP | Nafion | 100 | — | — | — |
| Comparative Example 3 | 50 | b1 | 5 | Water/IPA | Nafion | 60 | 40 | >10 | — |
| Comparative Example 4 | 50 | Nafion | 5 | NMP | b1 | 60 | 40 | >10 | — |
| Comparative Example 5 | 50 | Nafion | — | — | — | — | — | — | — |

| | Third layer | | | | | | Evaluation results | | |
|---|---|---|---|---|---|---|---|---|---|
| | Thickness (μm) | Platinum | Total thickness (μm) | Thickness of mixed region (μm) | Adhesiveness test | Peeling test (N) | Water electrolysis performance test Voltage (V) | Durability test Post-test voltage increment (V) | |
| Example 1 | — | — | 55 | 1.8 | Adhesion | 3.2 | 1.72 | 0.02 | |
| Example 2 | — | — | 55 | 1.7 | Adhesion | 3.1 | 1.72 | 0.01 | |
| Example 3 | 10 | ○ | 55 | 1.9 | Adhesion | 3.2 | 1.74 | 0.01 | |
| Example 4 | — | — | 55 | 2.2 | Adhesion | 1.5 | 1.71 | 0.02 | |
| Example 5 | — | — | 55 | 2.3 | Adhesion | 0.9 | 1.72 | 0.02 | |
| Example 6 | — | — | 55 | 1.0 | Adhesion | 0.8 | 1.70 | 0.05 | |
| Example 7 | — | — | 55 | 2.2 | Adhesion | 4.5 | 1.82 | 0.01 | |
| Example 8 | — | — | 80 | 5.4 | Adhesion | 3.8 | 1.78 | 0.01 | |
| Example 9 | — | — | 50.5 | 0.3 | Adhesion | 0.9 | 1.69 | 0.06 | |
| Example 10 | — | — | 11 | 0.6 | Adhesion | 2.4 | 1.62 | 0.07 | |
| Example 11 | — | — | 55 | 2.4 | Adhesion | 3.1 | 1.75 | 0.02 | |
| Example 12 | — | — | 55 | 2.2 | Adhesion | 3.3 | 1.76 | 0.02 | |
| Example 13 | — | — | 55 | 1.6 | Adhesion | 3.5 | 1.79 | 0.02 | |
| Example 14 | — | — | 55 | 0.3 | Adhesion | 0.3 | 1.70 | 0.07 | |
| Example 15 | — | — | 55 | 2.3 | Adhesion | 5 | 1.88 | 0.01 | |

TABLE 1-continued

| | | | | | | | | |
|---|---|---|---|---|---|---|---|---|
| Example 16 | — | — | 55 | 2.0 | Adhesion | 3.5 | 1.72 | 0.01 |
| Comparative Example 1 | — | — | 50 | — | — | — | 1.68 | 0.11 |
| Comparative Example 2 | — | — | 55 | None | Delamination | — | — | — |
| Comparative Example 3 | — | — | 55 | None | Delamination | — | — | — |
| Comparative Example 4 | — | — | 55 | None | Delamination | — | — | — |
| Comparative Example 5 | — | — | 50 | — | — | — | 1.79 | 0.04 |

In "Polymer electrolyte" of the first layer in the table, b1 represents the block copolymer b1, b2 represents the block copolymer b2, b3 represents the block copolymer b3, and r1 represents the random copolymer r1.

This application claims priority based on Japanese Patent Application No. 2019-063208 filed on Mar. 28, 2019, and the entire contents described in the claims and the specification attached to the request of the Japanese patent application can be incorporated.

The invention claimed is:

1. A laminated electrolyte membrane comprising a first layer comprising a hydrocarbon polymer electrolyte as a major component, and a second layer comprising a fluoropolymer electrolyte and polyvinylidene fluoride as major components laminated on at least one side of the first layer, wherein
the first layer and the second layer are laminated via a region in which components constituting both layers are mixed in a mixed region; and wherein
the mixed region has a thickness of 0.2 μm or more and is 80% or less of a total thickness of the first layer and the second layer.

2. The laminated electrolyte membrane according to claim 1, further comprising a third layer comprising a fluoropolymer electrolyte as a major component laminated on a surface of the second layer opposite the first layer.

3. The laminated electrolyte membrane according to claim 2, wherein at least one of the first layer, the second layer, and the third layer comprises platinum.

4. The laminated electrolyte membrane according to claim 1, wherein a content of the polyvinylidene fluoride contained in the second layer is 20 to 90 mass % where a total mass of the fluoropolymer electrolyte and the polyvinylidene fluoride is 100 mass %.

5. The laminated electrolyte membrane according to claim 1, wherein a thickness of the second layer is 40% or less of a thickness of the first layer.

6. The laminated electrolyte membrane according to claim 1, wherein a peel strength between the first layer and the second layer is 0.3 N or more.

7. The laminated electrolyte membrane according to claim 1, wherein the hydrocarbon polymer electrolyte comprises an ionic group-containing polyether ketone polymer as a major component.

8. A catalyst-coated laminated electrolyte membrane, comprising the laminated electrolyte membrane according to claim 1, an anode catalyst layer on one surface of the laminated electrolyte membrane, and a cathode catalyst layer on the opposite surface of the laminated electrolyte membrane.

9. The catalyst-coated laminated electrolyte membrane according to claim 8, wherein the second layer is laminated between the first layer and the anode catalyst layer.

10. A membrane electrode assembly in which an anode-side feeder is laminated on the anode catalyst layer of the catalyst-coated laminated electrolyte membrane according to claim 8 and a cathode-side feeder is laminated on the cathode catalyst layer.

11. The membrane electrode assembly according to claim 10, wherein the anode-side feeder is formed of an inorganic conductive substance.

12. A water electrolysis hydrogen generator comprising the laminated electrolyte membrane according to claim 1.

13. A water electrolysis hydrogen generator comprising the catalyst-coated laminated electrolyte membrane according to claim 8.

14. A water electrolysis hydrogen generator comprising the membrane electrode assembly according to claim 10.

* * * * *